United States Patent
Sotak et al.

(10) Patent No.: US 9,709,405 B2
(45) Date of Patent: Jul. 18, 2017

(54) METHODS FOR ATTITUDE AND HEADING REFERENCE SYSTEM TO MITIGATE VEHICLE ACCELERATION EFFECTS

(71) Applicant: Honeywell International Inc., Morris Plains, NJ (US)

(72) Inventors: Milos Sotak, Slavkov u Brna (CZ); Pavol Malinak, Markusovce (SK); Zdenek Kana, Dubnany (CZ); Jindrich Dunik, Plzen (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/949,437

(22) Filed: Nov. 23, 2015

(65) Prior Publication Data

US 2017/0146347 A1 May 25, 2017

(51) Int. Cl.
*G01C 21/18* (2006.01)
*G01C 23/00* (2006.01)
*B64D 43/02* (2006.01)
*G01P 15/18* (2013.01)
*G01C 19/00* (2013.01)

(52) U.S. Cl.
CPC .......... *G01C 21/18* (2013.01); *B64D 43/02* (2013.01); *G01C 19/00* (2013.01); *G01C 23/00* (2013.01); *G01P 15/18* (2013.01)

(58) Field of Classification Search
CPC ....................................................... G01C 21/18
See application file for complete search history.

(56) References Cited

U.S. PATENT DOCUMENTS

| | | | |
|---|---|---|---|
| 6,697,736 B2 | 2/2004 | Lin | |
| 7,239,975 B2 * | 7/2007 | Coleman | G01C 21/18 702/150 |
| 7,526,402 B2 | 4/2009 | Tanenhaus et al. | |
| 7,548,835 B2 * | 6/2009 | Lin | G01C 21/18 318/561 |
| 7,587,277 B1 | 9/2009 | Wells | |
| 7,643,939 B2 | 1/2010 | Zeng et al. | |
| 2003/0149528 A1 | 8/2003 | Lin | |
| 2005/0240347 A1 * | 10/2005 | Yang | G01C 21/16 701/500 |
| 2006/0265120 A1 * | 11/2006 | Coleman | G01C 21/18 702/153 |

(Continued)

OTHER PUBLICATIONS

Kang et. al., "Improvement of Attitude Estimation Using Hidden Markov Model Classification", American Institute of Aeronautics and Astronautics, 2010, pp. 1-9.

(Continued)

*Primary Examiner* — Angela Oritz
*Assistant Examiner* — Michael Berns
(74) *Attorney, Agent, or Firm* — Fogg & Powers LLC (57) ABSTRACT

An attitude and heading reference system (AHRS) for a vehicle is provided along with methods for mitigating vehicle acceleration effects in the AHRS. The AHRS comprises an inertial measurement unit configured to generate inertial measurements from at least one accelerometer and at least one gyroscope, a heading source configured to generate heading measurements, and an adaptive statistical filter configured to mitigate the impact of vehicle acceleration effects on attitude and heading.

19 Claims, 4 Drawing Sheets

(56) References Cited

U.S. PATENT DOCUMENTS

2008/0071480 A1* 3/2008 Lin .................. G01C 21/18
  702/35
2016/0047675 A1* 2/2016 Tanenhaus ............. G01C 21/16
  702/104

OTHER PUBLICATIONS

Leccadito, Matthew, "A Kalman Filter Based Attitude Heading Reference System Using a Low Cost Inertial Measurement Unit", Aug. 2013, pp. 1-96, Publisher: Virginia Commonwealth University, Published in: Richmond, Virginia.
Marins et al., "An Extended Kalman Filter for Quaternion-Based Orientation Estimation Using MARG Sensors", International Conference on Intelligent Robots and Systems, Oct. 29, 2001, pp. 2003-2011, Publisher: IEEE, Published in: Maui, Hawaii.
Sabatini, "Variable-State-Dimension Kalman-Based Filter for Orientation Determination Using Inertial and Magnetic Sensors", Sensors, Jun. 25, 2012, pp. 8492-8506.
European Patent Office, "Extended European Search Report from EP Application No. 16190016.2 mailed Apr. 3, 2017", From Foreign Counterpart of U.S. Appl. No. 14/949,437, Apr. 3, 2017, pp. 1-8, Published in: EP.

* cited by examiner

METHODS FOR ATTITUDE AND HEADING REFERENCE SYSTEM TO MITIGATE VEHICLE ACCELERATION EFFECTS

This invention was made with Government support under Government Contract Number 2014TA0303067 awarded by the Technological Agency of the Czech Republic. The Government has certain rights in the invention.

BACKGROUND

The attitude and heading reference system (AHRS) used in aircraft vehicles is typically based on a complementary filtering algorithm. The AHRS typically uses Gravity vector matching to estimate the attitude of the aircraft. However, unless aided by other systems, such as air-data systems or the global positioning system (GPS), current AHRS implementations are not able to efficiently compensate for vehicle acceleration, which acts as a parasite value in a specific force measurement.

SUMMARY

An attitude and heading reference system (AHRS) for a vehicle is provided along with methods for mitigating vehicle acceleration effects in the AHRS. The AHRS comprises an inertial measurement unit configured to generate inertial measurements from at least one accelerometer and at least one gyroscope, a heading source configured to generate heading measurements, and an adaptive statistical filter configured to mitigate the impact of vehicle acceleration effects on attitude and heading.

DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Methods for mitigating vehicle acceleration effects in an attitude and heading reference system (AHRS) for a vehicle are described herein. A proper modeling of vehicle acceleration is needed to achieve a reasonable accuracy for the AHRS. An adaptive statistical filtering technique, such as an extended Kalman filter (EKF), comprises an algorithm that provides a probabilistic description of estimated quantities, and is used to estimate the vehicle acceleration, where a proper vehicle acceleration model is to be defined. Due to different dynamic conditions a suitable unified vehicle acceleration model is hard to identify. Thus, an adaptive method is deployed instead to properly deal with an instant vehicle dynamics.

An algorithmic method to model the underlying aircraft vehicle acceleration as an error source is provided. Two embodiments of adapting a vehicle acceleration model are described herein to mitigate the parasite influence of vehicle acceleration. The present methods adapt a vehicle acceleration model based on measured and estimated variables. These techniques significantly increase a reachable accuracy, effectively remove the common mode failure of complementary filter based AHRS in dynamic conditions, and are able to provide statistics of the estimation errors.

In addition to AHRS, the present methods can be applied to Air Data aided (AD) AHRS, GPS-aided AHRS, and the like.

Further details of the present methods are described hereafter in the following sections and with reference to the drawings.

Sensor Errors

The AHRS obtains inertial data from an inertial measurement unit (IMU), which generally includes a three-axis gyroscope and a three-axis accelerometer. Properties of the gyroscope and accelerometer sensor errors can be predicted based on sensor models.

A gyroscope sensor model can be defined by the following equation:

$$\tilde{\omega}_{IB}^B = \omega_{IB}^B + (b_{gyrB,const}^B + b_{gyrB,dyn}^B) + w_{gyr}^B \quad w_{gyr}^B \sim N(0, \sigma_{gyr}^2) \qquad (1)$$

where $\tilde{\omega}_{IB}^B$ is the measured quantity of the angular rate of body frame with respect to inertial frame expressed in the body frame outputted by the gyroscope; $\omega_{IB}^B$ is the true angular rate; $b_{gyrB,const}^B$ is the gyroscope constant bias in the body frame; $b_{gyrB,dyn}^B$ is the gyroscope dynamic bias in the body frame; $w_{gyr}^B$ is the gyroscope white noise in the body frame; and $N(0, \sigma_{gyr}^2)$ is the normal (Gaussian) distribution with zero mean and variance equal to $\sigma_{gyr}^2$.

The total gyroscope bias in the body frame ($b_{gyrB}^B$) corresponds to the sum of the gyroscope constant and dynamic bias ($b_{gyrB,const}^B + b_{gyrB,dyn}^B$), and (within an error state EKF implementation scheme) can be modeled such as first-order Gauss-Markov (GM) process using the following equation:

$$\delta \dot{b}_{gyrB}^B = -\frac{1}{\tau_{gyr}} \delta b_{gyrB}^B + w_{GMgyrB}^B \qquad (2)$$

$$w_{GMgyrB}^B \sim N(0, \sigma_{GMgyrB}^2)$$

where $\delta \dot{b}_{gyrB}^B$ is the time derivative of the error of the estimate of the gyroscope bias, $\tau_{gyr}$ is the time constant of the GM process used to model the gyroscope bias, $w_{GMgyrB}^B$ is the gyroscope bias estimation error.

An accelerometer sensor model can be defined by the following equation:

$$\tilde{f}^B = a^B - g^B + (b_{accB,const}^B + b_{accB,dyn}^B) + w_{acc}^B \quad w_{acc}^B \sim N(0, \sigma_{acc}^2) \qquad (3)$$

where $\tilde{f}^B$ is the measured quantity of the specific force in the body frame outputted by the accelerometer; $a^B$ is the true body frame (vehicle) acceleration; $g^B$ is the gravity field vector in the body frame; $b_{accB,const}^B$ is the accelerometer constant bias in the body frame; $b_{accB,dyn}^B$ is the accelerometer dynamic bias in the body frame; and $w_{acc}^B$ is the accelerometer white noise in the body frame. The total accelerometer bias in the body frame ($b_{accB}^B$) corresponds to the sum of the accelerometer constant and dynamic bias ($b_{accB,const}^B + b_{accB,dyn}^B$), and (within an error state EKF implementation scheme) can be modeled such as GM process using the following equation:

$$\delta \dot{b}_{accB}^B = -\frac{1}{\tau_{acc}} \delta b_{accB}^B + w_{GMaccB}^B \quad (4)$$

$$w_{GMaccB}^B \sim N(0, \sigma_{GMaccB}^2)$$

where $\delta \dot{b}_{accB}^B$ is the time derivative of the error of the estimate of the accelerometer bias, $\tau_{acc}$ is the time constant of the GM process used to model the accelerometer bias, $w_{GMaccB}^B$ is the driving noise of the GM process used to model the accelerometer bias, and $\delta b_{accB}^B$ is the accelerometer bias estimation error.

The AHRS obtains or calculates heading data from a sensor such as magnetometer. While a magnetometer sensor model can be used to predict magnetometer sensor errors properties, assumes to be calibrated such the model can be replaced by simplified heading aiding based on the following equations:

$$\delta \tilde{\psi} = (-\tan \theta \cos \omega) \epsilon^{Nx} + (-\tan \theta \sin \psi) \epsilon^{Ny} - \epsilon^{Nz} - w_\psi^N$$

$$w_\psi^N \sim N(0, \sigma_\psi^2) \quad (5)$$

where $\delta \tilde{\psi}$ is heading measurement residual (constructed as a difference between estimated and measured heading), $\epsilon^N$ is the attitude error resolved in the navigation frame, and $w_\psi^N$ is a white noise of heading aiding. Heading aiding can be taken from any heading source.

Earth and Transport Rates

The AHRS takes into account earth and transport rates (ETR) in producing attitude and heading data. The ETR is expressed in the navigation frame and can be modeled by a single GM process, with parameters of the GM process being estimated via a stochastic analysis.

The physical relationship of ETR is expressed by the following equations:

$$\psi_{NB}^B = \omega_{IB}^B - \omega_{IN}^B \quad (6)$$

$$\omega_{IN}^B = \omega_{IE}^B + \omega_{EN}^B \quad (7)$$

where $\omega_{NB}^B$ is the angular rate of the body frame with respect to navigation frame expressed in body frame, $\omega_{IN}^B$ is the angular rate of the navigation frame with respect to the inertial frame expressed in body frame, $\omega_{IE}^B$ is the earth rate expressed in body frame, and $\omega_{EN}^B$ is the transport rate expressed in body frame.

The ETR, $\omega_{GM,IN}^N$, can be modeled such as a single GM process using the following equation:

$$\delta \dot{\omega}_{GM,IN}^N = -\frac{1}{\tau_{GM,IN}} \delta \omega_{GM,IN}^N + w_{GM,IN}^N \quad (8)$$

$$w_{GM,IN}^N \sim N(0, \sigma_{GM,IN}^2)$$

where $\delta \dot{\omega}_{GM,IN}^N$ is the time derivative of the error of the estimate of the ETR GM process, $\tau_{GM,IN}$ is the time constant of the GM process used to model the ETR, $w_{GM,IN}^N$ is the driving noise of the GM process, and $\delta \omega_{GM,IN}^N$ is the earth and transport rates estimate error.

Vehicle Acceleration

The AHRS also takes into account vehicle acceleration in producing attitude and heading data. The physical relationship of the vehicle acceleration can be according to (3) expressed as follows:

$$\tilde{f}^B = f^B + b_{accB}^B + w_{acc}^B = a^B - C_N^B g^N + b_{accB}^B + w_{acc}^B \quad (9)$$

where $\tilde{f}^B$ is the measured quantity of specific force (accelerometer output), $f^B$ is the true specific force, $b_{accB}^B$ is the true total accelerometer bias in the body frame, $w_{acc}^B$ is the accelerometer white noise in the body frame, $a^B$ is the true vehicle acceleration, $C_N^B$ is the true direction cosine matrix performing the transformation of a vector coordinated in the navigation frame to the body frame, and $g^N$ is the true Gravity field vector in navigation frame. The vehicle acceleration, which is significant source of attitude error if unknown and not accounted for, can be (within an error state EKF implementation scheme) modeled such as GM process using the following equation:

$$\delta \dot{a}^B = -\frac{1}{\tau_{acceleration}} \delta a^B + w_{GMacceleration}^B \quad (10)$$

$$w_{GMacceleration}^B \sim N(0, \sigma_{GMacceleration}^2)$$

where $\delta \dot{a}^B$ is time derivative of the error of the estimate of the GM process used to model the (so-called external) vehicle acceleration, $\tau_{acceleration}$ is the time constant of the GM process, $\delta a^B$ is error estimate of the vehicle acceleration, and $w_{GMacceleration}^B$ is driving noise of the GM process.

The presented approach provides a way to quantify steady-state standard deviation (STD) of the vehicle acceleration GM process ($\sigma_{steadyState,GMacceleration}$) and to make it proportional to the vehicle acceleration:

$$\sigma_{steadyState,GMacceleration}^2 = \sigma_{steadyState,acceleration}^2 + \alpha^2 \quad (11)$$

with a lower boundary defined as:

$$\sigma_{steadyState,GMacceleration}^2 = \text{func}_1 (\sigma_{steadyState,accelerometer}^2) \quad (12)$$

and an upper boundary defined as:

$$\sigma_{steadyState,GMacceleration}^2 = \text{func}_2 (a^B) \quad (13)$$

The lower boundary is due to accelerometer bias, and is used to set-up a steady-state STD minimum value. Overbounding is used to compensate for different dynamics of vehicle acceleration and accelerometer bias. A solution is provided by using an overbounding factor, $\eta$, as follows: $\eta \sigma_{steadyState,accelerometer}^2$. The upper boundary is due to vehicle acceleration, and is employed to avoid using an estimated acceleration to define the property of its own model (GM process), as well as to cope with a lack of information about the source axis of the vehicle acceleration. A solution is provided by using a norm of the "synthetic" vehicle acceleration, which is a combination of the measured and estimated quantities and is defined as follows:

$$\alpha = \|\hat{\tilde{a}}^B\| = \|\tilde{f}^B + \hat{C}_N^B \hat{g}^N - \hat{b}_{accB}^B\| \quad (14)$$

where upper script $\hat{\cdot}$ represents estimated parameters.

Use of the lower and upper boundaries results in the following relationship:

$$\sigma_{steadyState,GMacceleration}^2 = (\eta \sigma_{steadyState,accelerometer})^2 + \alpha^2 \quad (15)$$

An upper boundary error analysis can be performed based on the following equation:

$$\alpha = \text{func}(a^B) = \|\hat{a}^B\| = \|\tilde{f}^B + \hat{C}_N^B \hat{g}^N - \hat{b}_{accB}^B\| =$$

$$= \|a^B + C_N^B[\epsilon_N \times]g^N - \delta b_{accB}^B + w_{acc}^B + \hat{C}_N^B w_{grav}^N\| \quad (16)$$

The terms $\delta b_{accB}^B$, $w_{acc}^B$, $\hat{C}_N^B w_{grav}^N$ in equation (16) are assumed to have a negligible effect on the resulting acceleration estimate.

In a first technique, a first upper boundary computation algorithm computes the norm of the corresponding vector sum, and employs the overbounding factor, $\eta$, as indicated in the following equations:

$$\alpha = \|\hat{\bar{a}}^B\| \approx \|\tilde{f}^B + \hat{C}_N^B \hat{g}^N - \hat{b}_{accB}^B\| \quad (17)$$

$$\sigma_{steadyState,GMacceleration}^2 = (\eta \sigma_{Stationary,accelerometer})^2 + \alpha^2 \quad (18)$$

The first technique has the advantage of being a straightforward computation, with almost no computational overhead, and provides a conservative approach in most situations. This technique is based on the norm of the acceleration and affects all axes regardless of the source axis of the acceleration. The minimum value of the steady-state STD is governed by the overbounding factor, $\eta$. The first technique is described in further detail hereafter.

In a second technique, a second upper boundary computation algorithm computes the norm of the corresponding vector sum, and performs computations based on the attitude error scanning based on the following equations:

$$\alpha = \max_i \{\|\tilde{f}^B + \{\hat{C}_N^B(i)\}\hat{g}^N - \hat{b}_{accB}^B\|; \hat{C}_N^B(i) = f(\hat{\Phi}_j, \hat{\theta}_k)\} \quad (19)$$

$$\hat{\Phi}_j \in [-\Delta\sigma_{\hat{\Phi}} + \hat{\Phi}; \hat{\Phi} + \Delta\sigma_{\hat{\Phi}}]; \Delta\sigma_{\hat{\Phi}} = N\sigma_{\hat{\Phi}} \quad (20)$$

$$\hat{\theta}_k \in [-\Delta\sigma_{\hat{\theta}} + \hat{\theta}; \hat{\theta} + \Delta\sigma_{\hat{\theta}}]; \Delta\sigma_{\hat{\theta}} = N\sigma_{\hat{\theta}} \quad (21)$$

$$\sigma_{steadyState,GMacceleration}^2 = \alpha^2 \quad (22)$$

where $\tilde{f}^B$ is a measured specific force in the body frame, $\hat{b}_{accB}^B$ is the estimated accelerometer bias, $\hat{C}_N^B \hat{g}^N$ represents the estimated gravity vector in the body frame, $\hat{\Phi}_j$ is the estimated roll angle, $\hat{\theta}_k$ is the estimated pitch angle, $\sigma_{\hat{\Phi}}$ is the standard deviation of the estimated roll angle, and $\sigma_{\hat{\theta}}$ is the standard deviation of the estimated pitch angle. The standard deviations of the roll angle and pitch angle estimates are provided by the extended Kalman filter. It should be noted that $\Delta\sigma_{\hat{\Phi}} = N\sigma_{\hat{\Phi}}$ and $\Delta\sigma_{\hat{\theta}} = N\sigma_{\hat{\theta}}$, where N represents a scale factor which governs the size of the interval in order to perform more conservative (large N) or less conservative (small N) attitude error scanning. The second technique provides a conservative approach as compared to the first technique, and is based on the maximum of the norm of the acceleration. The method affects all axes regardless of the source axis of the acceleration, and solves the situation where the acceleration model does not overbound the true instantaneous acceleration. The second technique is described in further detail hereafter.

Figure 1:
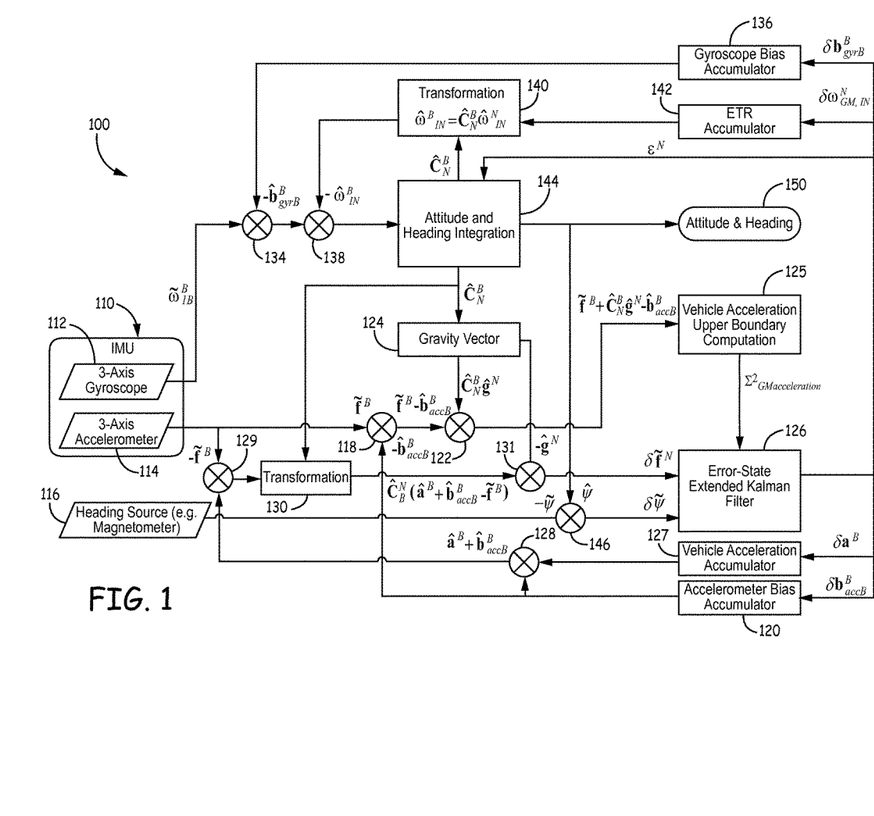
FIG. 1 is a block diagram of the software architecture for a pure inertial AHRS, according to an exemplary embodiment.

FIG. 1 is a block diagram of the software architecture for a pure inertial AHRS 100, according to one embodiment.

The AHRS 100 obtains inertial data from an inertial measurement unit (IMU) 110, which can include a 3-axis gyroscope 112 and a 3-axis accelerometer 114. In addition AHRS 100 obtains heading data from a heading source unit 116, such as a magnetometer. The AHRS 100 generally includes various functional modules as described hereafter.

A measured quantity of specific force ($\tilde{f}^B$) output from accelerometer 114 is sent to a mixer 118, which also receives an estimated accelerometer bias signal ($\hat{b}_{accB}^B$) output from an accelerometer bias accumulator 120. An output signal ($\tilde{f}^B - \hat{b}_{accB}^B$) from mixer 118 is sent to a mixer 122, which also receives an estimated gravity vector signal expressed in body frame ($\hat{C}_N^B \hat{g}^N$) output from a gravity vector block 124.

A vehicle acceleration upper boundary computation module 125 receives the output signal from mixer 122. The vehicle acceleration upper boundary computation module 125 includes algorithms that provide mitigation for vehicle acceleration, and are described in further detail hereafter. The vehicle acceleration upper boundary computation module 125 generates power spectral density (PSD) data of the GM process ($\Sigma_{GMacceleration}^2$) that is sent to an error-state EKF 126 for further processing.

A vehicle acceleration accumulator 127 outputs an estimated vehicle acceleration signal ($\hat{a}^B$) to a mixer 128, which also receives the estimated accelerometer bias signal ($\hat{b}_{accB}^B$) from accelerometer bias accumulator 120. The estimated accelerometer bias is summed with the estimated vehicle acceleration in mixer 128, which outputs this sum ($\hat{a}^B + \hat{b}_{accB}^B$) to a mixer 129, which also receives the measured quantity of specific force output from accelerometer 114. The mixer 129 subtracts the measured quantity of specific force from the sum output by mixer 128, and outputs the result ($\hat{a}^B + \hat{b}_{accB}^B - \tilde{f}^B$), which is in the body frame, to a transformation block 130. The transformation block 130 also receives an estimated direction cosine matrix ($\hat{C}_N^B$) signal output from an attitude and heading integration module 144, which is described further hereafter.

In transformation block 130, an estimated direction cosine matrix ($\hat{C}_B^N$) is created as a transposition of the $\hat{C}_N^B$ matrix (i.e., $\hat{C}_B^N = (\hat{C}_N^B)^T$). The result from mixer 129 is transformed by multiplying with the estimated direction cosine matrix $\hat{C}_B^N$, which performs the transformation from the body frame to the navigation frame. An output signal ($\hat{C}_B^N(\hat{a}^B + \hat{b}_{accB}^B - \tilde{f}^B)$) from transformation block 130 is sent to a mixer 131, which also receives an estimated gravity vector in the navigation frame ($\hat{g}^N$) from gravity vector block 124. The estimated gravity vector is subtracted in mixer 131, resulting in specific force measurement residuals in the navigation frame ($\delta \tilde{f}^N$), which are sent to the error-state EKF 126 for further processing.

A measured quantity of the angular rate ($\tilde{\omega}_{IB}^B$) output from gyroscope 112 is sent to a mixer 134, which also receives a gyroscope bias signal ($\hat{b}_{gyrB}^B$) output from a gyroscope bias accumulator 136. An output signal from mixer 134 is sent to a mixer 138, which also receives an estimated ETR signal ($\hat{\omega}_{IN}^B$) output from a transformation block 140, where $\hat{\omega}_{IN}^B = \hat{C}_N^B \hat{\omega}_{IN}^N$. An Earth and Transport Rates accumulator 142 sends an output signal to transformation block 140.

A measured heading ($\tilde{\psi}$) output from heading unit 116 is sent to a mixer 146, which also receives an estimated heading ($\hat{\psi}$) from attitude and heading integration module 144. In mixer 146, the estimated heading is subtracted from the measured heading, resulting in heading measurement residuals ($\delta\tilde{\psi}$), which are sent to the error-state EKF 126 for further processing.

The error-state EKF 126 generates and outputs various estimation error signals, including an estimated vehicle acceleration error signal ($\delta a^B$) that is sent to the vehicle acceleration accumulator 127; an estimated accelerometer bias error signal ($\delta b_{accB}^B$) that is sent to the accelerometer bias accumulator 120; a gyroscope bias errors signal ($\delta b_{gyrB}^B$) that is sent to the gyroscope bias accumulator 136; an ETR errors signal ($\delta\omega_{GM,IN}^N$) that is sent to the ETR accumulator 142; and an attitude errors signal ($\epsilon^N$) that is sent to the attitude and heading integration module 144.

The attitude and heading integration module 144 receives an output signal from mixer 138 and performs direction cosine matrix-based or quaternion-based integration. The attitude and heading integration module 144 receives also the attitude errors signal ($\epsilon^N$) from the error-state EKF 126 to correct the direction cosine matrix. The attitude and heading integration module 144 sends the estimated direction cosine matrix ($\hat{C}_B^N$) to transformation blocks 130 and 140 and to gravity vector block 124. The attitude and heading integration module 144 is configured to generate attitude and heading outputs 150 that are used by a vehicle navigation system.

Figure 2:
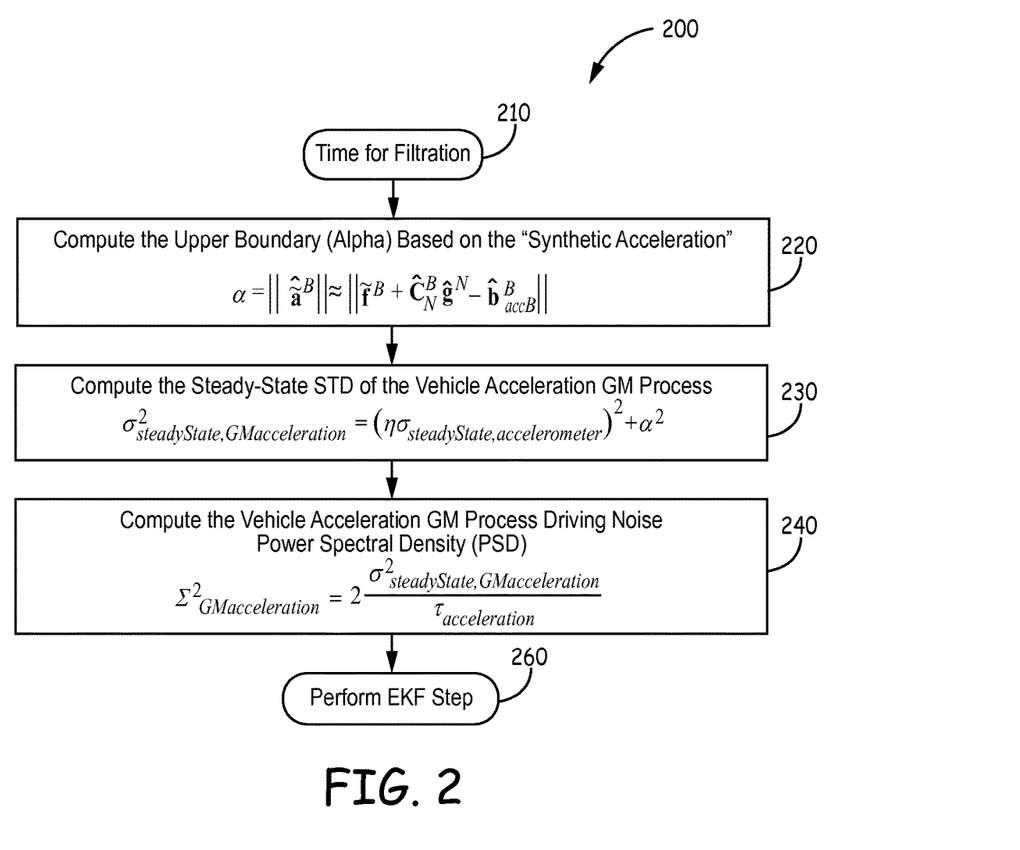
FIG. 2 is a flow diagram for a vehicle acceleration upper boundary computation method, according to a first method.

FIG. 2 is a flow diagram for a vehicle acceleration adaptation algorithm according to a first embodiment, which can be employed by vehicle acceleration upper boundary computation module 125. At a time for filtration 210, algorithm 200 computes the upper boundary (alpha, $\alpha$) based on the "synthetic acceleration" ($\tilde{\tilde{a}}^B$) (block 220) using equation (17).

The algorithm 200 then computes the steady-state STD of the vehicle acceleration GM process (block 230) using equation (18).

The algorithm 200 next computes PSD of the vehicle acceleration GM process driving noise (block 240) using the equation:

$$\sum_{GMacceleration}^{2} = 2\frac{\sigma_{steadyState\cdot GMacceleration}^{2}}{\tau_{acceleration}} \quad (23)$$

where $\Sigma_{GMacceleration}^2$ represents adapted quantity of PSD and is used for construction of process noise covariance matrix. Thereafter, an error-state EKF step is performed at 260.

Figure 3:
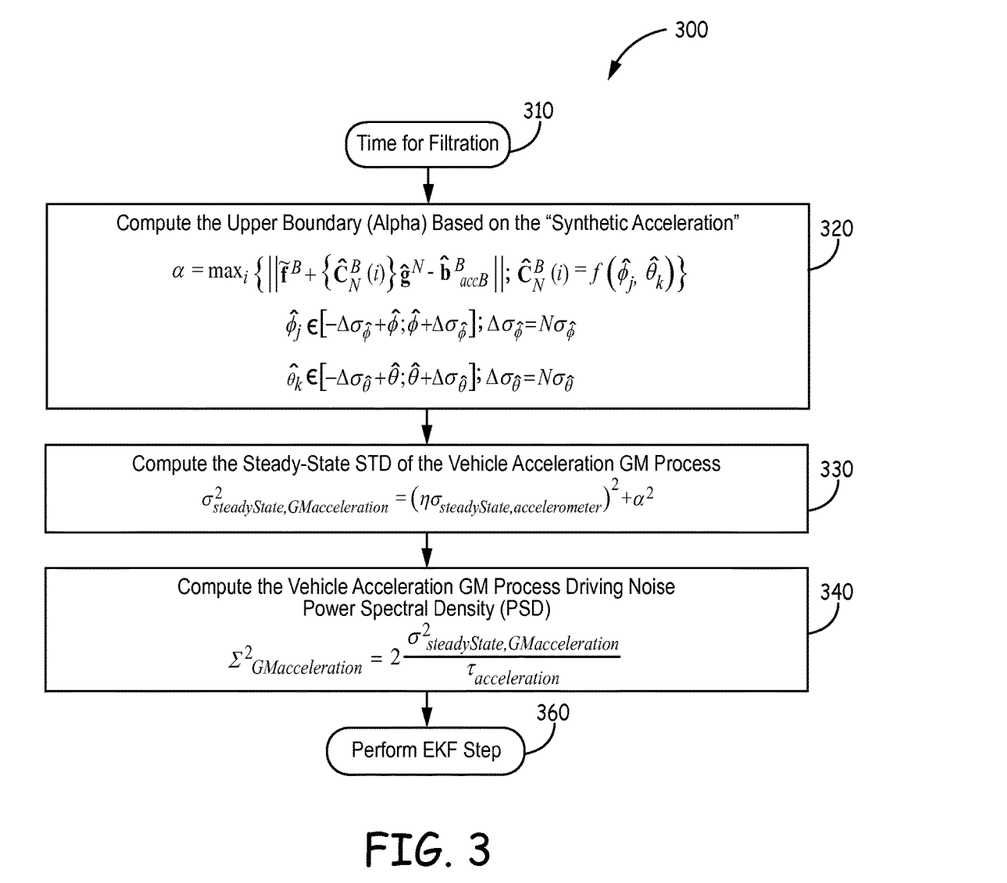
FIG. 3 is a flow diagram for a vehicle acceleration upper boundary computation method, according to a second method.

FIG. 3 is a flow diagram for a vehicle acceleration adaptation algorithm 300 according to a second embodiment, which can be employed by vehicle acceleration upper boundary computation module 125. At a time for filtration 310, algorithm 300 computes the upper boundary (alpha) based on the "synthetic acceleration" (block 320) using the equations (19), (20), (21) and (22).

The algorithm 300 then computes the steady-state STD of the vehicle acceleration GM process (block 330) using equation (18).

The algorithm 300 next computes the vehicle acceleration GM process driving noise PSD (block 340) using equation (23), where $\Sigma_{GMacceleration}^2$ represents adapted quantity of PSD and is used for construction of a process noise covariance matrix. Thereafter, an extended Kalman filter (EKF) step is performed at 360.

Figure 4:
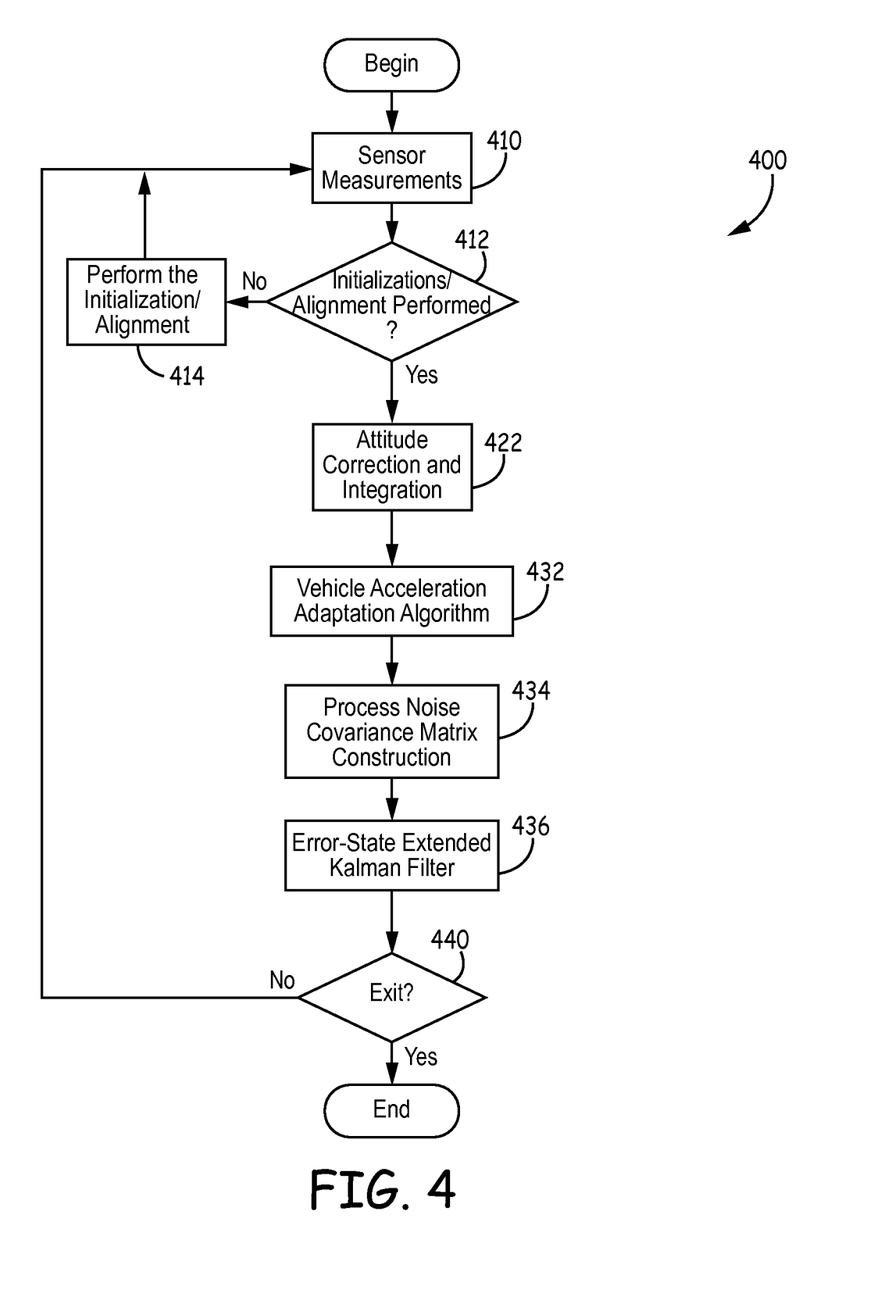
FIG. 4 is a flow diagram for a method of operating a pure inertial AHRS with a vehicle acceleration mitigation algorithm, according to one embodiment.

An exemplary process model that can be employed in algorithm 400 is defined by the following equations:

$$\begin{bmatrix} \dot{\epsilon}^N \\ \delta\dot{b}_{gyrB}^B \\ \delta\dot{a}^B \\ \delta\dot{\omega}_{GM,IN}^N \\ \delta\dot{b}_{accB}^B \end{bmatrix} = \quad (24)$$

$$\begin{bmatrix} -[\hat{\omega}_{IN}^N \times] & +\hat{C}_B^N & 0_{3\times3} & I_3 & 0_{3\times3} \\ 0_{3\times3} & -1/\tau_{gyr} & 0_{3\times3} & 0_{3\times3} & 0_{3\times3} \\ 0_{3\times3} & 0_{3\times3} & -1/\tau_{acceleration} & 0_{3\times3} & 0_{3\times3} \\ 0_{3\times3} & 0_{3\times3} & 0_{3\times3} & -1/\tau_{GM,IN} & 0_{3\times3} \\ 0_{3\times3} & 0_{3\times3} & 0_{3\times3} & 0_{3\times3} & -1/\tau_{acc} \end{bmatrix}$$

$$\begin{bmatrix} \epsilon^N \\ \delta b_{gyrB}^B \\ \delta a^B \\ \delta\omega_{GM,IN}^N \\ \delta b_{accB}^B \end{bmatrix} + \begin{bmatrix} I_3 & -\hat{C}_B^N & 0_{3\times3} & 0_{3\times3} & 0_{3\times3} & 0_{3\times3} \\ 0_{3\times3} & 0_{3\times3} & I_3 & 0_{3\times3} & 0_{3\times3} & 0_{3\times3} \\ 0_{3\times3} & 0_{3\times3} & 0_{3\times3} & I_3 & 0_{3\times3} & 0_{3\times3} \\ 0_{3\times3} & 0_{3\times3} & 0_{3\times3} & 0_{3\times3} & I_3 & 0_{3\times3} \\ 0_{3\times3} & 0_{3\times3} & 0_{3\times3} & 0_{3\times3} & 0_{3\times3} & I_3 \end{bmatrix}$$

$$\begin{bmatrix} w_{IN}^N \\ w_{gyr}^B \\ w_{GMgyrB}^B \\ w_{GMacceleration}^B \\ w_{GM,IN}^N \\ w_{GMacc}^B \end{bmatrix}$$

where process noise covariance matrix (Q) is defined by:

$$Q = \begin{bmatrix} \sigma_{IN}^2 + \hat{C}_B^N \sigma_{gyr}^2 \hat{C}_N^B & 0_{3\times3} & 0_{3\times3} & 0_{3\times3} & 0_{3\times3} \\ 0_{3\times3} & \sum_{GMgyrB}^2 & 0_{3\times3} & 0_{3\times3} & 0_{3\times3} \\ 0_{3\times3} & 0_{3\times3} & \sum_{GMacceleration}^2 & 0_{3\times3} & 0_{3\times3} \\ 0_{3\times3} & 0_{3\times3} & 0_{3\times3} & \sum_{GM,IN}^2 & 0_{3\times3} \\ 0_{3\times3} & 0_{3\times3} & 0_{3\times3} & 0_{3\times3} & \sum_{GMaccB}^2 \end{bmatrix} \quad (25)$$

where $\Sigma^2$ are the power spectral densities of respective parameters.

An exemplary measurement model that can be employed in algorithms 400 is defined by the following equations:

$$\begin{bmatrix} \delta \hat{f}^N \\ \delta \tilde{\psi} \end{bmatrix} = \begin{bmatrix} [g^N \times] & 0_{3\times 3} & \hat{C}_B^N & 0_{1\times 3} & +\hat{C}_B^N \\ T(3,:) & 0_{1\times 3} & 0_{1\times 3} & 0_{1\times 3} & 0_{1\times 3} \end{bmatrix} \begin{bmatrix} \varepsilon^N \\ \delta b_{gyrB}^B \\ \delta a^B \\ \sigma \omega_{GN,IN}^N \\ \delta b_{accB}^B \end{bmatrix} + \quad (26)$$

$$\begin{bmatrix} -\hat{C}_B^N & -I_3 & 0_{3\times 3} \\ 0_{1\times 3} & 0_{1\times 3} & -1 \end{bmatrix} \begin{bmatrix} w_{sf}^B \\ w_{grav}^N \\ w_{\psi}^N \end{bmatrix}$$

where measurement covariance matrix $$R = \begin{bmatrix} \hat{C}_B^N \sigma_{acc}^2 \hat{C}_N^B + \sum_{grav}^{2} & 0_{3\times 1} \\ 0_{1\times 3} & \sigma_{\psi}^2 \end{bmatrix} \quad (27)$$

where $\varepsilon^N$ is the attitude error vector, $\delta b_{gyrB}^B$ is the gyroscope bias error vector, $\delta a^B$ is the vehicle acceleration error vector, $\delta \omega_{GM,IN}^N$ is the earth and transport rate error vector, $\delta b_{accB}^B$ is the accelerometer bias error vector, $\delta \hat{f}^N$ is the specific force error vector, $\delta \psi$ is the heading error, and T is the transformation matrix which transforms rotation vector to Euler angles and can be expressed as:

$$T = \begin{bmatrix} -\frac{\cos\psi}{\cos\theta} & -\frac{\sin\psi}{\cos\theta} & 0 \\ \sin\psi & -\cos\psi & 0 \\ -\tan\theta\cos\psi & -\tan\theta\sin\psi & -1 \end{bmatrix} \quad (28)$$

FIG. 4 is a flow diagram for a method 400 operating a pure inertial AHRS with a vehicle acceleration mitigation algorithm, according to one embodiment. The method 400 begins with obtaining sensor measurements (block 410) from an IMU. A determination is then made whether initialization/alignment has been performed (block 412). If not, method 400 performs the initialization/alignment (block 414), and sensor measurements are again obtained at block 410. When the determination is made that the initialization/alignment has been performed at block 412, attitude correction and integration is performed (block 422). A vehicle acceleration adaptation algorithm is then performed (block 432), such as algorithm 200 of FIG. 2, or algorithm 300 of FIG. 3.

As shown in FIG. 4, a process noise covariance matrix construction is then performed (block 434), and the results are sent to the error-state extended Kalman Filter (block 436) for processing. The method 400 then determines whether to exit (block 440). If the determination is made not to exit at block 440, then method 400 returns to block 410 to obtain additional sensor measurements, and the above steps are repeated. When the determination to exit is made at block 440, method 400 comes to an end.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes an attitude and heading reference system (AHRS) for a vehicle, the AHRS comprising an inertial measurement unit (IMU) configured to generate inertial measurements from at least one accelerometer and at least one gyroscope; a heading source configured to generate heading measurements; and an adaptive statistical filter configured to mitigate the impact of vehicle acceleration effects on attitude and heading.

Example 2 includes the AHRS of Example 1, wherein the adaptive statistical filter is configured to estimate an attitude and heading of the vehicle; model and estimate deployed sensor errors and other sources of errors; and model, adapt, and estimate vehicle acceleration.

Example 3 includes the AHRS of Example 2, wherein the modeled vehicle acceleration is adapted based on measured variables and estimated variables using one or more adaptation algorithms.

Example 4 includes the AHRS of Example 3, wherein the one or more adaptation algorithms are configured to detect vehicle acceleration; compute a synthetic acceleration; compute a vehicle acceleration upper boundary; and transform the vehicle acceleration upper boundary onto parameters for the modeled vehicle acceleration.

Example 5 includes the AHRS of any of Examples 1-4, wherein the adaptive statistical filter comprises an algorithm providing a probabilistic description of estimated quantities.

Example 6 includes the AHRS of any of Examples 1-4, wherein the adaptive statistical filter comprises an extended Kalman filter.

Example 7 includes the AHRS of any of Examples 1-6, further comprising an upper boundary computation module that includes a first vehicle acceleration adaptation algorithm configured to: provide a vehicle acceleration model based on measured variables and estimated variables; compute a vehicle acceleration upper boundary (α) based on a synthetic acceleration ($\hat{\tilde{a}}^B$) as:

$$\alpha = \|\hat{\tilde{a}}^B\| = \|\tilde{f}^B + \hat{C}_N^B \hat{g}^N - \hat{b}_{accB}^B\|$$

where $\tilde{f}^B$ is the measured specific force signal output from the accelerometer, $\hat{C}_N^B \hat{g}^N$ is the estimated gravity vector signal, and $\hat{b}_{accB}^B$ is the estimated accelerometer bias signal; compute a steady-state standard deviation ($\sigma_{steadyState,GMacceleration}$) of a vehicle acceleration first-order GM process as:

$$\sigma_{steadyState,GMacceleration}^2 = (\eta \sigma_{steadyState,accelerometer})^2 + \alpha^2$$

where η is an overbounding factor; compute a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process; construct a process noise covariance matrix by use of the power spectral density; and send results of the process noise covariance matrix construction to the adaptive statistical filter.

Example 8 includes the AHRS of any of Examples 1-6, further comprising an upper boundary computation module that includes a second vehicle acceleration adaptation algorithm configured to: provide a vehicle acceleration model based on measured variables and estimated variables; compute a vehicle acceleration upper boundary (α) based on a synthetic acceleration ($\hat{\tilde{a}}^B$) as:

$$\alpha = \max_i \left\{ \left\| \tilde{f}^B + \{\hat{C}_N^B(i)\}\hat{g}^N - \hat{b}_{accB}^B \right\|; \hat{C}_N^B(i) = f(\hat{\phi}_j, \hat{\theta}_k) \right\}$$

$$\hat{\phi}_j \in [-\Delta\sigma_{\hat{\phi}} + \hat{\phi}; \hat{\phi} + \Delta\sigma_{\hat{\phi}}]; \Delta\sigma_{\hat{\phi}} = N\sigma_{\hat{\phi}}$$

$$\hat{\theta}_k \in [-\Delta\sigma_{\hat{\theta}} + \hat{\theta}; \hat{\theta} + \Delta\sigma_{\hat{\theta}}]; \Delta\sigma_{\hat{\theta}} = N\sigma_{\hat{\theta}}$$

where $\tilde{f}^B$ is a measured specific force in the body frame, $\hat{b}_{accB}^B$ is the estimated accelerometer bias, $\hat{C}_N^B \hat{g}^N$ represents the estimated gravity vector in the body frame, $\hat{\Phi}_j$ is the estimated roll angle, $\sigma_{\hat{\theta}}$ is the estimated pitch angle, $\sigma_{\hat{\Phi}}$ is the standard deviation of the estimated roll angle, $\sigma_{\hat{\theta}}$ is the standard deviation of the estimated pitch angle, wherein the standard deviations of the roll angle and pitch angle estimates are provided by the adaptive statistical filter, and for $\Delta\sigma_{\hat{\Phi}} = N\sigma_{\hat{\Phi}}$ and $\Delta\sigma_{\hat{\theta}} = N\sigma_{\hat{\theta}}$, the N represents a scale factor which governs the size of an interval in order to perform more conservative (larger N) or less conservative (smaller N) attitude error scanning; compute a steady-state standard deviation ($\sigma_{steadyState,GMacceleration}$) of a vehicle acceleration first-order GM process as:

$$\sigma_{steadyState,GMacceleration}^2 = (\eta \sigma_{steadyState,accelerometer})^2 + \alpha^2$$

where η is an overbounding factor; compute a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process; construct a process noise covariance matrix by use of the power spectral density; and send results of the process noise covariance matrix construction to the adaptive statistical filter.

Example 9 includes the AHRS of any of Examples 1-8, wherein the IMU comprises a three-axis accelerometer and a three-axis gyroscope.

Example 10 includes a method for mitigating vehicle acceleration effects in an attitude and heading reference system, the method comprising: obtaining inertial data from an inertial measurement unit (IMU) that includes at least one accelerometer and at least one gyroscope; computing a heading based on heading-related measurements; determining models of sensors and other sources of errors; identifying vehicle acceleration and computing a vehicle acceleration upper boundary based on measured variables; and performing a computation of an adaptive statistical filter configured to estimate attitude and heading while adaptively mitigating the impact of vehicle acceleration effects on the estimate by use of the vehicle acceleration upper boundary.

Example 11 includes the method of Example 10, wherein the adaptive statistical filter comprises an algorithm providing a probabilistic description of estimated quantities.

Example 12 includes the method of Example 10, wherein the adaptive statistical filter comprises an extended Kalman filter.

Example 13 includes the method of any of Examples 10-12, wherein the upper boundary computation is performed by a first vehicle acceleration adaptation algorithm comprising: providing a vehicle acceleration model based on measured variables and estimated variables; computing a vehicle acceleration upper boundary (α) based on a synthetic acceleration ($\hat{\tilde{a}}^B$) as:

$$\alpha = \|\hat{\tilde{a}}^B\| \approx \|\tilde{f}^B + \hat{C}_N^B \hat{g}^N - \hat{b}_{accB}^B\|$$

where $\tilde{f}^B$ is a measured specific force signal output from the accelerometer, $\hat{C}_N^B \hat{g}^N$ is the estimated gravity vector signal, and $\hat{b}_{accB}^B$ is an estimated accelerometer bias signal; computing a steady-state standard deviation ($\sigma_{steadyState,GMacceleration}$) of a vehicle acceleration first-order Gauss-Markov process as:

$$\sigma_{steadyState,GMacceleration}^2 = (\eta \sigma_{steadyState,accelerometer})^2 + \alpha^2$$

where η is an overbounding factor; computing a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process; constructing a process noise covariance matrix by use of the power spectral density; and sending results of the process noise covariance matrix construction to the adaptive statistical filter.

Example 14 includes the method of any of Examples 10-12, wherein the upper boundary computation is performed by a second vehicle acceleration adaptation algorithm comprising: providing a vehicle acceleration model based on measured variables and estimated variables; computing a vehicle acceleration upper boundary (α) based on a synthetic acceleration ($\hat{\bar{a}}^B$) as:

$$\alpha = \max_i \left\{ \left\| \tilde{f}^B + \{\hat{C}_N^B(i)\}\hat{g}^N - \hat{b}_{accB}^B \right\|; \hat{C}_N^B(i) = f(\hat{\phi}_j, \hat{\theta}_k) \right\}$$

$$\hat{\phi}_j \in [-\Delta\sigma_{\hat{\phi}} + \hat{\phi}; \hat{\phi} + \Delta\sigma_{\hat{\phi}}]; \Delta\sigma_{\hat{\phi}} = N\sigma_{\hat{\phi}}$$

$$\hat{\theta}_k \in [-\Delta\sigma_{\hat{\theta}} + \hat{\theta}; \hat{\theta} + \Delta\sigma_{\hat{\theta}}]; \Delta\sigma_{\hat{\theta}} = N\sigma_{\hat{\theta}}$$

where $\tilde{f}^B$ is a measured specific force in the body frame, $\hat{b}_{accB}^B$ is the estimated accelerometer bias, $\hat{C}_N^B \hat{g}^N$ represents the estimated gravity vector in the body frame, $\hat{\Phi}_j$ is the estimated roll angle, $\hat{\theta}_k$ is the estimated pitch angle, $\sigma_{\hat{\Phi}}$ is the standard deviation of the estimated roll angle, $\sigma_{\hat{\theta}}$ is the standard deviation of the estimated pitch angle, wherein the standard deviations of the roll angle and pitch angle estimates are provided by the adaptive statistical filter, and for $\Delta\sigma_{\hat{\Phi}} = N\sigma_{\hat{\Phi}}$ and $\Delta\sigma_{\hat{\theta}} = N\sigma_{\hat{\theta}}$, the N represents a scale factor which governs the size of an interval in order to perform more conservative (larger N) or less conservative (smaller N) attitude error scanning; computing a steady-state standard deviation ($\sigma_{steadyState,GMacceleration}$) of a vehicle acceleration first-order GM process as:

$$\sigma_{steadyState,GMacceleration}^2 = (\eta \sigma_{steadyState,accelerometer})^2 + \alpha^2$$

where η is an overbounding factor; computing a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process; constructing a process noise covariance matrix by use of the power spectral density; and sending results of the process noise covariance matrix construction to the adaptive statistical filter.

Example 15 includes the method of any of Examples 10-14, wherein the IMU comprises a three-axis accelerometer and a three-axis gyroscope.

Example 16 includes a computer program product comprising a non-transitory computer readable medium having instructions stored thereon executable by a processor to perform a method for mitigating vehicle acceleration effects in an attitude and heading reference system (AHRS), the method comprising: obtaining inertial data from an inertial measurement unit that includes at least one accelerometer and at least one gyroscope; computing a heading based on heading-related measurements; determining models of sensors and other sources of errors; identifying vehicle acceleration and computing a vehicle acceleration upper boundary based on measured variables; and performing a computation of an adaptive statistical filter configured to estimate the attitude and heading while adaptively mitigating the impact of vehicle acceleration effects on the estimate by use of the vehicle acceleration upper boundary.

Example 17 includes the computer program product of Example 16, wherein the upper boundary computation is performed by a first algorithm that generates the vehicle acceleration mitigation data, the first algorithm comprising: providing a vehicle acceleration model based on measured variables and estimated variables; computing a vehicle acceleration upper boundary (α) based on a synthetic acceleration ($\hat{\bar{a}}^B$) as:

$$\alpha = \| \hat{\bar{a}}^B \| \approx \| \tilde{f}^B + \hat{C}_N^B \hat{g}^N - \hat{b}_{accB}^B \|$$

where $\tilde{f}^B$ is a measured specific force signal output from the accelerometer, $\hat{C}_N^B \hat{g}^N$ is an estimated gravity vector signal, and $\hat{b}_{accB}^B$ is an estimated accelerometer bias signal; computing a steady-state standard deviation ($\sigma_{steadyState,GMacceleration}$) of a vehicle acceleration first-order GM process as:

$$\sigma_{steadyState,GMacceleration}^2 = (\eta \sigma_{steadyState,accelerometer})^2 + \alpha^2$$

where η is an overbounding factor; computing a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process; constructing a process noise covariance matrix by use of the power spectral density; and sending results of the process noise covariance matrix construction to the adaptive statistical filter.

Example 18 includes the computer program product of Example 16, wherein the upper boundary computation is performed by a second algorithm that generates the vehicle acceleration mitigation data, the second algorithm comprising: providing a vehicle acceleration model based on measured variables and estimated variables; computing a vehicle acceleration upper boundary (α) based on a synthetic acceleration ($\hat{\bar{a}}^B$) as:

$$\alpha = \max_i \left\{ \left\| \tilde{f}^B + \{\hat{C}_N^B(i)\}\hat{g}^N - \hat{b}_{accB}^B \right\|; \hat{C}_N^B(i) = f(\hat{\phi}_j, \hat{\theta}_k) \right\}$$

$$\hat{\phi}_j \in [-\Delta\sigma_{\hat{\phi}} + \hat{\phi}; \hat{\phi} + \Delta\sigma_{\hat{\phi}}]; \Delta\sigma_{\hat{\phi}} = N\sigma_{\hat{\phi}}$$

$$\hat{\theta}_k \in [-\Delta\sigma_{\hat{\theta}} + \hat{\theta}; \hat{\theta} + \Delta\sigma_{\hat{\theta}}]; \Delta\sigma_{\hat{\theta}} = N\sigma_{\hat{\theta}}$$

where $\tilde{f}^B$ is a measured specific force in the body frame, $\hat{b}_{accB}^B$ is the estimated accelerometer bias, $\hat{C}_N^B \hat{g}^N$ represents the estimated gravity vector in the body frame, $\hat{\Phi}_j$ is the estimated roll angle, $\hat{\theta}_k$ is the estimated pitch angle, $\sigma_{\hat{\Phi}}$ is the standard deviation of the estimated roll angle, and $\sigma_{\hat{\theta}}$ is the standard deviation of the estimated pitch angle, wherein the standard deviations of the roll angle and pitch angle estimates are provided by the adaptive statistical filter, and for $\Delta\sigma_{\hat{\Phi}} = N\sigma_{\hat{\Phi}}$ and $\Delta\sigma_{\hat{\theta}} = N\sigma_{\hat{\theta}}$, the N represents a scale factor which governs the size of an interval in order to perform more conservative (larger N) or less conservative (smaller N) attitude error scanning; computing a steady-state standard deviation ($\sigma_{steadyState,GMacceleration}$) of a vehicle acceleration first-order GM process as:

$$\sigma_{steadyState,GMacceleration}^2 = (\eta \sigma_{steadyState,accelerometer})^2 + \alpha^2$$

where η is an overbounding factor; computing a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process; constructing a process noise covariance matrix by use of the power spectral density; and sending results of the process noise covariance matrix construction to the adaptive statistical filter.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An attitude and heading reference system (AHRS) for a vehicle, the AHRS comprising:
   an inertial measurement unit (IMU) onboard the vehicle and configured to generate inertial measurements comprising angular rate and acceleration measurements of the vehicle;
   a heading source onboard the vehicle and configured to generate heading measurements of the vehicle; and
   a processor including an adaptive statistical filter onboard the vehicle and in operative communication with the IMU and the heading source, wherein the processor utilizes the adaptive statistical filter to mitigate the impact of vehicle acceleration effects on attitude and heading during operation of the vehicle, wherein the processor is configured to:
      estimate an attitude and heading of the vehicle;
      model and estimate IMU errors and heading source errors; and
      model, adapt, and estimate vehicle acceleration using an adaptation algorithm configured to:
         detect acceleration of the vehicle;
         compute a synthetic acceleration;
         compute a vehicle acceleration upper boundary; and
         transform the vehicle acceleration upper boundary onto parameters for the modeled vehicle acceleration; and
      mitigate the impact of vehicle acceleration effects on the attitude and heading estimate during operation of the vehicle using the vehicle acceleration upper boundary.

2. The AHRS of claim 1, wherein the adaptive statistical filter comprises an algorithm providing a probabilistic description of estimated quantities.

3. The AHRS of claim 2, wherein the adaptive statistical filter comprises an extended Kalman filter.

4. The AHRS of claim 2, further comprising an upper boundary computation module that includes a first vehicle acceleration adaptation algorithm configured to:
   provide a vehicle acceleration model based on measured variables and estimated variables;
   compute a vehicle acceleration upper boundary ($\alpha$) based on a synthetic acceleration ($\hat{\tilde{a}}^B$) as:

$$\alpha = \|\hat{\tilde{a}}^B\| \approx \|\tilde{f}^B + \hat{C}_N^B \hat{g}^N - \hat{b}_{accB}^B\|$$

where $\tilde{f}^B$ is a measured specific force signal output from the accelerometer, $\hat{C}_N^B \hat{g}^N$ is the estimated gravity vector signal, and $\hat{b}_{accB}^B$ is the estimated accelerometer bias signal;
   compute a steady-state standard deviation ($\sigma_{steadyState,GMacceleration}$) of a vehicle acceleration first-order Gauss-Markov (GM) process as:

$$\sigma_{steadyState,GMacceleration}^2 = (\eta \sigma_{steadyState,accelerometer})^2 + \alpha^2$$

where $\eta$ is an overbounding factor;
   compute a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process;
   construct a process noise covariance matrix by use of the power spectral density; and
   send results of the process noise covariance matrix construction to the adaptive statistical filter.

5. The AHRS of claim 2, further comprising an upper boundary computation module that includes a second vehicle acceleration adaptation algorithm configured to:
   provide a vehicle acceleration model based on measured variables and estimated variables;
   compute a vehicle acceleration upper boundary ($\alpha$) based on a synthetic acceleration ($\hat{\tilde{a}}^B$) as:

$$\alpha = \max_i \left\{ \left\| \tilde{f}^B + \{\hat{C}_N^B(i)\}\hat{g}^N - \hat{b}_{accB}^B \right\|; \hat{C}_N^B(i) = f(\hat{\phi}_j, \hat{\theta}_k) \right\}$$

$$\hat{\phi}_j \in [-\Delta\sigma_{\hat{\phi}} + \hat{\phi}; \hat{\phi} + \Delta\sigma_{\hat{\phi}}]; \Delta\sigma_{\hat{\phi}} = N\sigma_{\hat{\phi}}$$

$$\hat{\theta}_k \in [-\Delta\sigma_{\hat{\theta}} + \hat{\theta}; \hat{\theta} + \Delta\sigma_{\hat{\theta}}]; \Delta\sigma_{\hat{\theta}} = N\sigma_{\hat{\theta}}$$

where $\tilde{f}^B$ is a measured specific force in the body frame, $\hat{b}_{accB}^B$ is the estimated accelerometer bias, $\hat{C}_N^B \hat{g}^N$ represents the estimated gravity vector in the body frame, $\hat{\phi}_j$ is the estimated roll angle, $\hat{\theta}_k$ is the estimated pitch angle, $\sigma_{\hat{\phi}}$ is the standard deviation of the estimated roll angle, $\sigma_{\hat{\theta}}$ is the standard deviation of the estimated pitch angle, wherein the standard deviations of the roll angle and pitch angle estimates are provided by the adaptive statistical filter, and for $\Delta\sigma_{\hat{\phi}}=N\sigma_{\hat{\phi}}$ and $\Delta\sigma_{\hat{\theta}}=N\sigma_{\hat{\theta}}$, the N represents a scale factor which governs the size of an interval in order to perform more conservative or less conservative attitude error scanning;
   compute a steady-state standard deviation ($\sigma_{steadyState,GMacceleration}$) of a vehicle acceleration first-order Gauss-Markov (GM) process as:

$$\sigma_{steadyState,GMacceleration}^2 = (\eta \sigma_{steadyState,accelerometer})^2 + \alpha^2$$

where $\eta$ is an overbounding factor;
   compute a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process;
   construct a process noise covariance matrix by use of the power spectral density; and
   send results of the process noise covariance matrix construction to the adaptive statistical filter.

6. The AHRS of claim 1, wherein the IMU comprises a three-axis accelerometer and a three-axis gyroscope.

7. The AHRS of claim 1, wherein the vehicle is an aircraft.

8. The AHRS of claim 1, wherein the heading source comprises a magnetometer.

9. A method for mitigating vehicle acceleration effects in an attitude and heading reference system (AHRS), the method comprising:
obtaining inertial data from an inertial measurement unit (IMU) onboard a vehicle, the inertial data comprising angular rate and acceleration measurements of the vehicle;
obtaining heading measurements of the vehicle from a heading source onboard the vehicle; and
performing computations utilizing an adaptive statistical filter in a processor onboard the vehicle, the processor in operative communication with the IMU and the heading source, the computations comprising:
estimating an attitude and heading of the vehicle;
modeling and estimating IMU errors and heading source errors;
modeling and estimating vehicle acceleration using an adaptation algorithm comprising:
detecting acceleration of the vehicle;
computing a synthetic acceleration;
computing a vehicle acceleration upper boundary; and
transforming the vehicle acceleration upper boundary onto parameters for the modeled vehicle acceleration; and
mitigating the impact of vehicle acceleration effects on the attitude and heading estimate during operation of the vehicle using the vehicle acceleration upper boundary.

10. The method of claim 9, wherein the adaptive statistical filter comprises an algorithm providing a probabilistic description of estimated quantities.

11. The method of claim 10, wherein the upper boundary computation is performed by a first vehicle acceleration adaptation algorithm comprising:
providing a vehicle acceleration model based on measured variables and estimated variables;
computing a vehicle acceleration upper boundary ($\alpha$) based on a synthetic acceleration ($\hat{\tilde{a}}^B$) as:

$$\alpha = \|\hat{\tilde{a}}^B\| \approx \|\tilde{f}^B + \hat{C}_N^B \hat{g}^N - \hat{b}_{accB}^B\|$$

where $\tilde{f}^B$ is a measured specific force signal output from the accelerometer, $\hat{C}_N^B \hat{g}^N$ is an estimated gravity vector signal, and $\hat{b}_{accB}^B$ is an estimated accelerometer bias signal;
computing a steady-state standard deviation ($\sigma_{steadyState,GMacceleration}$) of a vehicle acceleration first-order Gauss-Markov (GM) process as:

$$\sigma_{steadyState,GMacceleration}^2 = (\eta \sigma_{steadyState,accelerometer})^2 + \alpha^2$$

where $\eta$ is an overbounding factor;
computing a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process;
constructing a process noise covariance matrix by use of the power spectral density; and
sending results of the process noise covariance matrix construction to the adaptive statistical filter.

12. The method of claim 10, wherein the upper boundary computation is performed by a second vehicle acceleration adaptation algorithm comprising:
providing a vehicle acceleration model based on measured variables and estimated variables;
computing a vehicle acceleration upper boundary ($\alpha$) based on a synthetic acceleration ($\hat{\tilde{a}}^B$) as:

$$\alpha = \max_i \left\{ \left\| \tilde{f}^B + \{\hat{C}_N^B(i)\} \hat{g}^N - \hat{b}_{accB}^B \right\| ; \hat{C}_N^B(i) = f(\hat{\phi}_j, \hat{\theta}_k) \right\}$$

$$\hat{\phi}_j \in [-\Delta \sigma_{\hat{\phi}} + \hat{\phi}; \hat{\phi} + \Delta \sigma_{\hat{\phi}}]; \Delta \sigma_{\hat{\phi}} = N \sigma_{\hat{\phi}}$$

$$\hat{\theta}_k \in [-\Delta \sigma_{\hat{\theta}} + \hat{\theta}; \hat{\theta} + \Delta \sigma_{\hat{\theta}}]; \Delta \sigma_{\hat{\theta}} = N \sigma_{\hat{\theta}}$$

where $\tilde{f}^B$ is a measured specific force in the body frame, $\hat{b}_{accB}^B$ is the estimated accelerometer bias, $\hat{C}_N^B \hat{g}^N$ represents the estimated gravity vector in the body frame, $\hat{\phi}_j$ is the estimated roll angle, $\hat{\theta}_k$ is the estimated pitch angle, $\sigma_{\hat{\phi}}$ is the standard deviation of the estimated roll angle, $\sigma_{\hat{\theta}}$ is the standard deviation of the estimated pitch angle, wherein the standard deviations of the roll angle and pitch angle estimates are provided by the adaptive statistical filter, and for $\Delta \sigma_{\hat{\phi}} = N \sigma_{\hat{\phi}}$ and $\Delta \sigma_{\hat{\theta}} = N \sigma_{\hat{\theta}}$, the N represents a scale factor which governs the size of an interval in order to perform more conservative or less conservative attitude error scanning;
computing a steady-state standard deviation ($\sigma_{steadyState,GMacceleration}$) of a vehicle acceleration first-order Gauss-Markov (GM) process as:

$$\sigma_{steadyState,GMacceleration}^2 = (\eta \sigma_{steadyState,accelerometerZ})^2 + \alpha^2$$

where $\eta$ is an overbounding factor;
computing compute a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process;
constructing a process noise covariance matrix by use of the power spectral density; and
sending results of the process noise covariance matrix construction to the adaptive statistical filter.

13. The method of claim 9, wherein the adaptive statistical filter comprises an extended Kalman filter.

14. The method of claim 9, wherein the IMU comprises a three-axis accelerometer and a three-axis gyroscope.

15. The method of claim 9, wherein the vehicle is an aircraft.

16. The method of claim 9, wherein the heading source comprises a magnetometer.

17. A computer program product comprising:
a non-transitory computer readable medium having instructions stored thereon executable by a processor to perform a method for mitigating vehicle acceleration effects in an attitude and heading reference system (AHRS), the method comprising:
obtaining inertial data from an inertial measurement unit (IMU) onboard a vehicle, the inertial data comprising angular rate and acceleration measurements of the vehicle;
obtaining heading measurements of the vehicle from a heading source onboard the vehicle; and
performing computations utilizing an adaptive statistical filter in a processor onboard the vehicle, the processor in operative communication with the IMU and the heading source, the computations comprising:
estimating an attitude and heading of the vehicle;
modeling and estimating IMU errors and heading source errors;
modeling and estimating vehicle acceleration using an adaptation algorithm comprising:
  detecting acceleration of the vehicle;
  computing a synthetic acceleration;
  computing a vehicle acceleration upper boundary; and
  transforming the vehicle acceleration upper boundary onto parameters for the modeled vehicle acceleration; and
mitigating the impact of vehicle acceleration effects on the attitude and heading estimate during operation of the vehicle using the vehicle acceleration upper boundary.

18. The computer program product of claim 17, wherein the upper boundary computation is performed by a first algorithm that generates the vehicle acceleration mitigation data, the first algorithm comprising:
providing a vehicle acceleration model based on measured variables and estimated variables;
computing a vehicle acceleration upper boundary ($\alpha$) based on a synthetic acceleration ($\hat{\tilde{a}}^B$) as:

$$\alpha = \|\hat{\tilde{a}}^B\| \approx \|\tilde{f}^B + \hat{C}_N^B \hat{g}^N - \hat{b}_{accB}^B\|$$

where $\tilde{f}^B$ is a measured specific force signal output from the accelerometer, $\hat{C}_N^B \hat{g}^N$ is an estimated gravity vector signal, and $\hat{b}_{accB}^B$ is an estimated accelerometer bias signal;
computing a steady-state standard deviation ($\sigma_{steadyState,GMacceleration}$)) of a vehicle acceleration first-order Gauss-Markov (GM) process as:

$$\sigma_{steadyState,GMacceleration}^2 = (\eta \sigma_{steadyState,accelerometer})^2 + \alpha^2$$

where $\eta$ is an overbounding factor;
computing a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process;
constructing a process noise covariance matrix by use of the power spectral density; and
sending results of the process noise covariance matrix construction to the adaptive statistical filter.

19. The computer program product of claim 17, wherein the upper boundary computation is performed by a second algorithm that generates the vehicle acceleration mitigation data, the second algorithm comprising:
providing a vehicle acceleration model based on measured variables and estimated variables;
computing a vehicle acceleration upper boundary ($\alpha$) based on a synthetic acceleration ($\hat{\tilde{a}}^B$) as:

$$\alpha = \max_i \left\{ \left\| \tilde{f}^B + \{\hat{C}_N^B(i)\} \hat{g}^N - \hat{b}_{accB}^B \right\|; \hat{C}_N^B(i) = f(\hat{\phi}_j, \hat{\theta}_k) \right\}$$

$$\hat{\phi}_j \in [-\Delta\sigma_{\hat{\phi}} + \hat{\phi}; \hat{\phi} + \Delta\sigma_{\hat{\phi}}]; \Delta\sigma_{\hat{\phi}} = N\sigma_{\hat{\phi}}$$

$$\hat{\theta}_k \in [-\Delta\sigma_{\hat{\theta}} + \hat{\theta}; \hat{\theta} + \Delta\sigma_{\hat{\theta}}]; \Delta\sigma_{\hat{\theta}} = N\sigma_{\hat{\theta}}$$

where $\tilde{f}^B$ is a measured specific force in the body frame, $\hat{b}_{accB}^B$ is the estimated accelerometer bias, $\hat{C}_N^B \hat{g}^N$ represents the estimated gravity vector in the body frame, $\hat{\phi}_j$ is the estimated roll angle, $\hat{\theta}_k$ is the estimated pitch angle, $\sigma_{\hat{\phi}}$ is the standard deviation of the estimated roll angle, $\sigma_{\hat{\theta}}$ is the standard deviation of the estimated pitch angle, wherein the standard deviations of the roll angle and pitch angle estimates are provided by the adaptive statistical filter, and for $\Delta\sigma_{\hat{\phi}} = N\sigma_{\hat{\phi}}$ and $\Delta\sigma_{\hat{\theta}} = N\sigma_{\hat{\theta}}$, the N represents a scale factor which governs the size of an interval in order to perform more conservative or less conservative attitude error scanning;
computing a steady-state standard deviation ($\sigma_{steadyState,GMacceleration}$) of a vehicle acceleration first-order Gauss-Markov (GM) process as:

$$\sigma_{steadyState,GMacceleration}^2 = (\eta \sigma_{steadyState,accelerometer})^2 + \alpha^2$$

where $\eta$ is an overbounding factor;
computing a power spectral density of the vehicle acceleration GM process driving noise as:

$$\sum_{GMacceleration}^2 = 2 \frac{\sigma_{steadyState,GMacceleration}^2}{\tau_{acceleration}}$$

where $\tau_{acceleration}$ is a time constant of the GM process;
constructing a process noise covariance matrix by use of the power spectral density; and
sending results of the process noise covariance matrix construction to the adaptive statistical filter.

* * * * *

UNITED STATES PATENT AND TRADEMARK OFFICE
CERTIFICATE OF CORRECTION

PATENT NO. : 9,709,405 B2
APPLICATION NO. : 14/949437
DATED : July 18, 2017
INVENTOR(S) : Sotak et al.

Page 1 of 2

It is certified that error appears in the above-identified patent and that said Letters Patent is hereby corrected as shown below:

In the Claims

At Claim 4, Column 15, Line 59, replace "$\alpha = \|\hat{\tilde{a}}^B\| \approx \|\tilde{f}^B + \hat{C}_N^B \hat{g}^N - \hat{b}_{accB}{}^B\|$" with -- $\alpha = \|\hat{\tilde{a}}^B\| \approx \|\tilde{f}^B + \hat{C}_N^B \hat{g}^N - \hat{b}_{accB}^B\|$ --.

At Claim 4, Column 15, Line 63, replace "$\hat{b}_{accB}{}^B$" with -- $\hat{b}_{accB}^B$ --.

At Claim 4, Column 15, Line 68, replace "$\dfrac{\sigma_{steadyState,GMacceleration}{}^2 = (\eta\sigma_{steadyState,accelerometer})^2 +}{\alpha^2}$" with -- $\sigma^2_{steadyState,GMacceleration} = (\eta\sigma_{steadyState,accelerometer})^2 + \alpha^2$ --.

At Claim 5, Column 16, Line 30, replace "$\hat{b}_{accB}{}^B$" with -- $\hat{b}_{accB}^B$ --.

At Claim 5, Column 16, Line 45, replace "$\dfrac{\sigma_{steadyState,GMacceleration}{}^2 = (\eta\sigma_{steadyState,accelerometer})^2 +}{\alpha^2}$" with -- $\sigma^2_{steadyState,GMacceleration} = (\eta\sigma_{steadyState,accelerometer})^2 + \alpha^2$ --.

At Claim 11, Column 17, Line 41, replace "$\alpha = \|\hat{\tilde{a}}^B\| \approx \|\tilde{f}^B + \hat{C}_N^B \hat{g}^N - \hat{b}_{accB}{}^B\|$" with -- $\alpha = \|\hat{\tilde{a}}^B\| \approx \|\tilde{f}^B + \hat{C}_N^B \hat{g}^N - \hat{b}_{accB}^B\|$ --.

Signed and Sealed this
Fourth Day of June, 2019

Andrei Iancu
*Director of the United States Patent and Trademark Office*

CERTIFICATE OF CORRECTION (continued)
U.S. Pat. No. 9,709,405 B2

At Claim 11, Column 17, Line 45, replace "$\hat{b}_{accB}{}^{B}$" with --$\hat{b}^{B}_{accB}$--.

At Claim 11, Column 17, Line 50, replace "$\sigma_{steadyState,GMacceleration}{}^{2}=(\eta\sigma_{steadyState,accelerometer})^{2}+\alpha^{2}$" with --$\sigma^{2}_{steadyState,GMacceleration} = \left(\eta\sigma_{steadyState,accelerometer}\right)^{2} + \alpha^{2}$--.

At Claim 12, Column 18, Line 15, replace "$\hat{b}_{accB}{}^{B}$" with --$\hat{b}^{B}_{accB}$--.

At Claim 12, Column 18, Line 30, replace "$\sigma_{steadyState,GMacceleration}{}^{2}=(\eta\sigma_{steadyState,accelerometerZ})^{2}zzz+\alpha^{2}$" with --$\sigma^{2}_{steadyState,GMacceleration} = \left(\eta\sigma_{steadyState,accelerometer}\right)^{2} + \alpha^{2}$--.

At Claim 18, Column 19, Line 29, replace "$\alpha = \|\tilde{\hat{a}}^{B}\| \approx \|\tilde{f}^{B} + \hat{C}_{N}^{B}\hat{g}^{N} - \hat{b}_{accB}{}^{B}\|$" with --$\alpha = \|\tilde{\hat{a}}^{B}\| \approx \|\tilde{f}^{B} + \hat{C}_{N}^{B}\hat{g}^{N} - \hat{b}^{B}_{accB}\|$--.

At Claim 18, Column 19, Line 32, replace "$\hat{b}_{accB}{}^{B}$" with --$\hat{b}^{B}_{accB}$--.

At Claim 18, Column 19, Line 34, replace "($\sigma_{steadyState,GMacceleration}$))" with --($\sigma_{steadyState,GMacceleration}$)--.

At Claim 18, Column 19, Line 37, replace "$\sigma_{steadyState,GMacceleration}{}^{2}=(\eta\sigma_{steadyState,accelerometer})^{2}+\alpha^{2}$" with --$\sigma^{2}_{steadyState,GMacceleration} = \left(\eta\sigma_{steadyState,accelerometer}\right)^{2} + \alpha^{2}$--.

At Claim 19, Column 20, Line 19, replace "$\hat{b}_{accB}{}^{B}$" with --$\hat{b}^{B}_{accB}$--.

At Claim 19, Column 20, Line 34, replace "$\sigma_{steadyState,GMacceleration}{}^{2}=(\eta\sigma_{steadyState,accelerometer})^{2}+\alpha^{2}$" with --$\sigma^{2}_{steadyState,GMacceleration} = \left(\eta\sigma_{steadyState,accelerometer}\right)^{2} + \alpha^{2}$--.